Aug. 8, 1950 H. F. ELLIOTT 2,517,854

APPARATUS FOR POSITIONING ROTARY CONTROLLED ELEMENTS

Filed Sept. 3, 1947 4 Sheets-Sheet 1

*INVENTOR.*
HAROLD F. ELLIOTT

BY Laurence B. Dodds
ATTORNEY

INVENTOR.
HAROLD F. ELLIOTT
BY Laurence B. Dodds
ATTORNEY

Aug. 8, 1950 H. F. ELLIOTT 2,517,854

APPARATUS FOR POSITIONING ROTARY CONTROLLED ELEMENTS

Filed Sept. 3, 1947 4 Sheets-Sheet 3

*INVENTOR.*
HAROLD F. ELLIOTT

BY Laurence B. Dodds

ATTORNEY

Aug. 8, 1950 H. F. ELLIOTT 2,517,854

APPARATUS FOR POSITIONING ROTARY CONTROLLED ELEMENTS

Filed Sept. 3, 1947 4 Sheets-Sheet 4

INVENTOR.
HAROLD F. ELLIOTT
BY Laurence B. Dodds
ATTORNEY

Patented Aug. 8, 1950 2,517,854

UNITED STATES PATENT OFFICE 2,517,854

APPARATUS FOR POSITIONING A ROTARY CONTROLLED ELEMENT

Harold F. Elliott, Palo Alto, Calif.

Application September 3, 1947, Serial No. 772,000

18 Claims. (Cl. 74—10.2)

Figure 1:
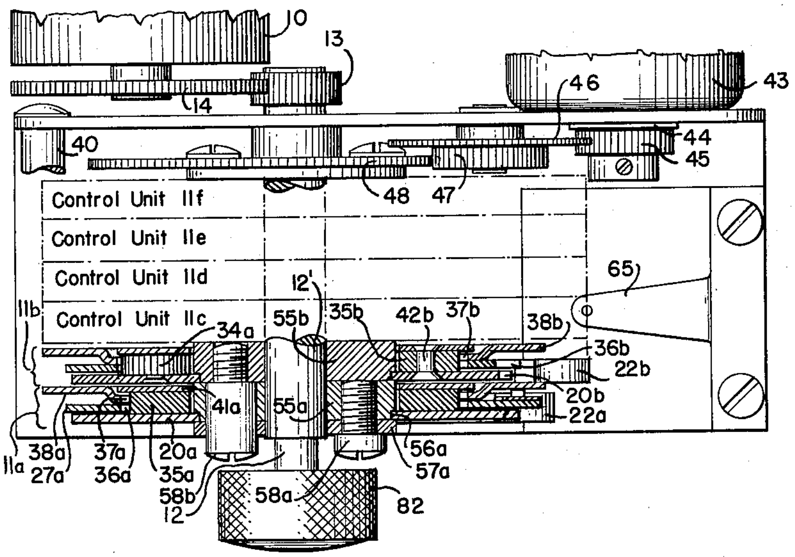

The present invention relates, in general, to apparatus for precisely positioning a rotary controlled element in a predetermined angular position. The apparatus here proposed is subject to a wide range of applications and may be advantageously employed in connection with any electrical or mechanical system having a controlled element to be positioned in any one of several preselected settings. For example, in the fields of radio, radar, television, and facsimile it is customary to determine an operating condition of the apparatus through the use of a tuning element which may be selectively adjusted. For convenience, the invention will be described in detail in connection with the selective tuning of a wave-signal receiver.

Control apparatus for accomplishing a desired tuning adjustment of a radio receiver have already been proposed and frequently embody a series of selector cams rotatable over a range slightly less than 180°. Each cam includes a stop device, such as a recess, and has an associated cam follower provided with a co-operating stop device, usually in the nature of a projecting element, to register with the stop recess and arrest rotation of the cam series. The controlled element is directly coupled with a rotatable shaft upon which the series of cams is secured in adjustably fixed positions, and selector magnets or the like, when selectively energized, arrest the controlled element in a preselected position determined by the particular cam and follower actuated by the selected magnet. Arrangements of this type also have a reversible driving system controlled by a sensing device to drive any selected cam to its home position through the shortest angular distance. While such apparatus has been used, it is found that there may be some inaccuracy due to play in the driving system if the selector cams are permitted to be arrested in home position from either direction of rotation.

In United States Letters Patent No. 2,299,083, granted applicant October 20, 1942, and entitled "Electric Control Apparatus," there is described and claimed a control apparatus of the foregoing type, but having a pivoted interlock element on the cam follower, the interlock being biased to cause the stop projection normally to be too large to register with the recess of its selector cam. The sensing device, which reverses the direction of rotation any time the cam drives through its home position without registration of the stop devices, controls the system to permit such registration only as the cam selector homes from a particular direction. The present invention is directed to a control apparatus of the type described including a simplified interlock mechanism.

Another control apparatus to which the invention is especially adapted, forms the subject of applicant's concurrently filed application Serial No. 771,999, filed September 3, 1947, and entitled "Apparatus for Positioning a Rotary Controlled Element." The apparatus of that application is of the multi-revolution type, including a series of units individually comprising a fast member rotatable within a multi-revolution range and having stop provisions for registering with a stop device to position the controlled element. The stop device is normally in an inactive position and a slow member concurrently driven with the fast member shifts the stop device to its active position when the slow member reaches a given angular setting. Fast operation is achieved by a sensing device which controls the direction of rotation to effect direct homing of the slow member. As pointed out in the reference application, an interlock or sequence control is desirable to avoid jamming or an undesired sequence of operations which may otherwise be encountered when tuning the radio receiver between frequencies which are closely spaced in the frequency spectrum. The arrangements to be described are particularly useful for assuring a preselected operating sequence in such apparatus.

It is an object of the present invention to provide an apparatus for positioning a rotary controlled element in a preselected angular position and having a new and improved sequence control for establishing a desired sequence of operations.

It is a further object of the invention to provide an improved and simplified sequence control for apparatus for positioning a rotary controlled element in a preselected angular position.

It is a specific object of the invention to provide an improved sequence control mechanism for control apparatus of the multi-revolution type utilized for positioning a rotary controlled element in a preselected angular position.

In accordance with the invention, apparatus for positioning a rotary controlled element in a preselected angular position comprises a stop device for controlling the position of the controlled element. The apparatus includes a rotatable member having provisions for registering with the stop device only when that member is in a predetermined angular position. The rotatable member has at least a portion which is displaceable to simulate rotation of that member in one direction over a small fraction of a revolution. The apparatus further includes a reversible driving system for the controlled element and rotatable member as well as sensing means, responsive to the orientation of the rotatable member relative to its predetermined position, for controlling the direction of rotation of the driving system to effect direct homing of the rotatable member to its predetermined position. Finally, the apparatus has means for displacing the displaceable portion of the rotatable member when that member is initially in its predetermined angular position to cause the sensing means to establish an opposite direction of rotation.

For a better understanding of the present invention, together with other and further objects thereof, reference is had to the following description taken in connection with the accompanying drawings, and its scope will be pointed out in the appended claims.

Figure 2:
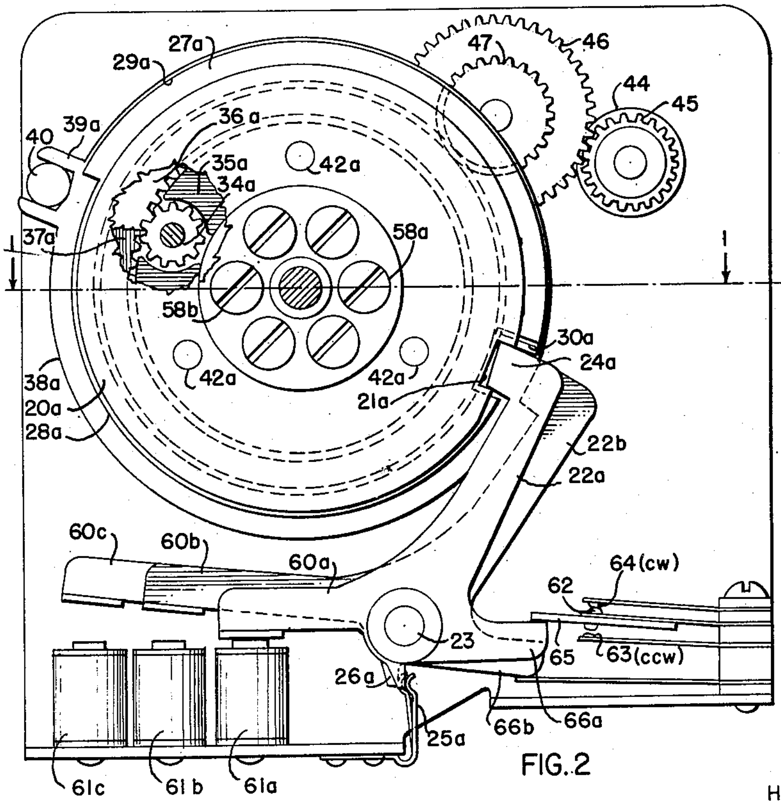
Figures 3, 4:
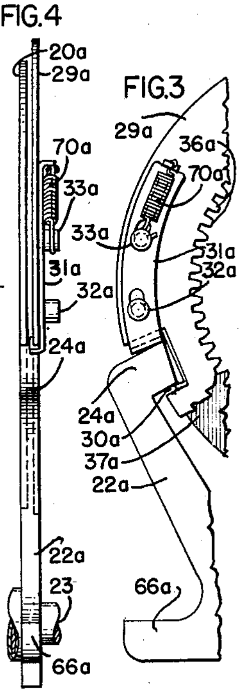
Figure 8:
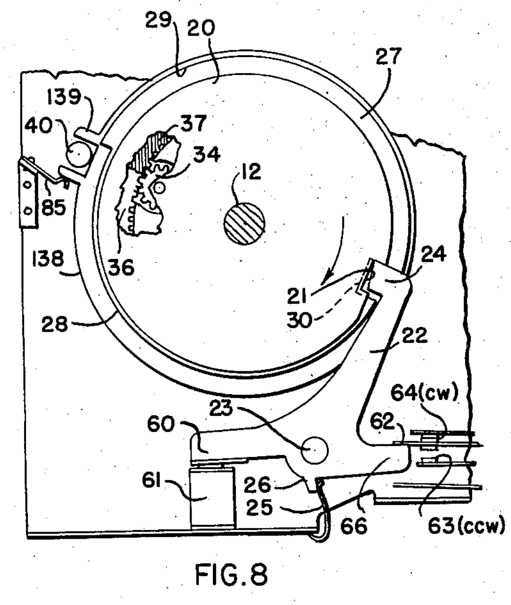
Figure 9:
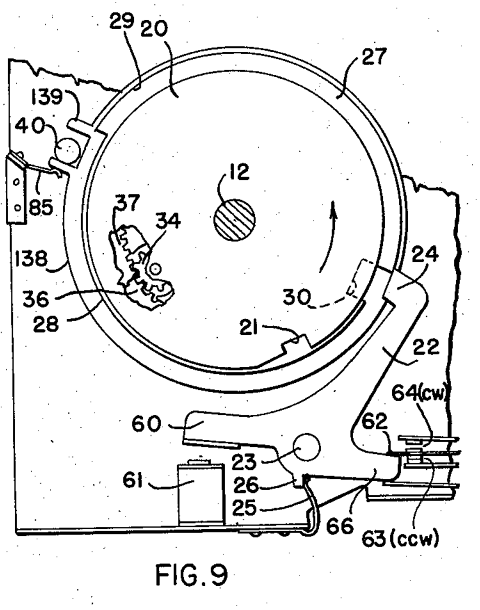
Figure 10:
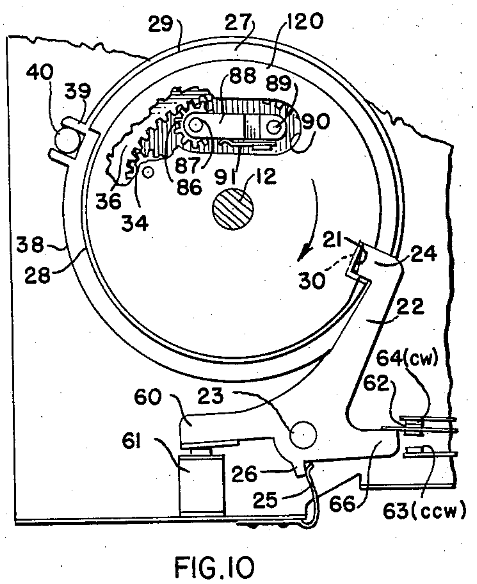
Figure 11:
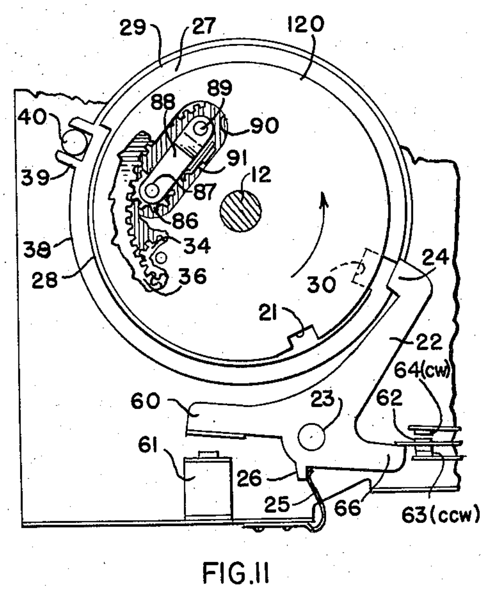
Figures 12, 13, 14:
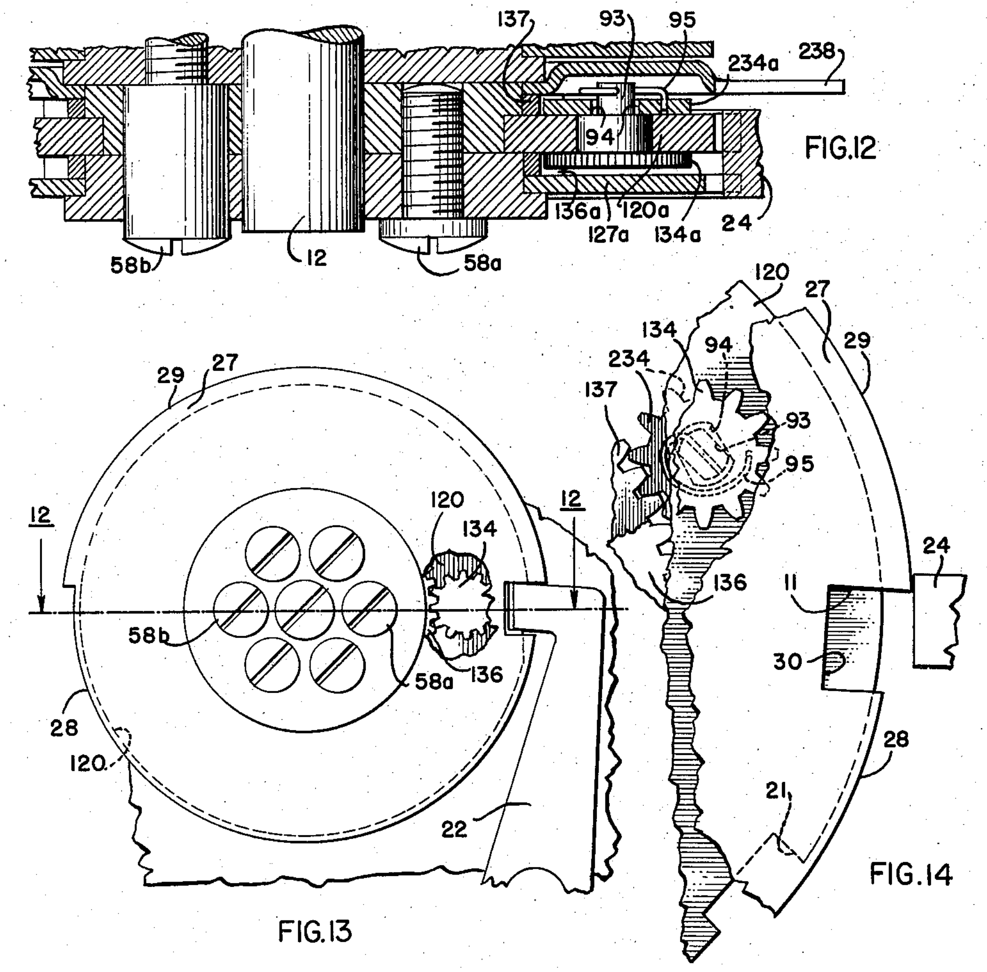
Figure 15:
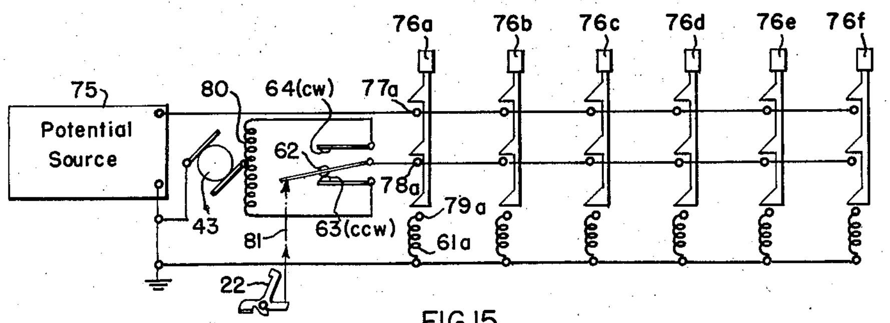

In the drawings, Fig. 1 is a view, partly schematic and partly in cross section, of an apparatus embodying the invention in one form; Fig. 2 is an elevation view of the apparatus of Fig. 1 partially broken away to reveal certain of the mechanical components; Figs. 3 and 4 are detail views of the apparatus of Fig. 1, and Figs. 5, 6, and 7 are schematic representations utilized in explaining the operation of the Fig. 1 embodiment. Figs. 8 and 9 are schematic views representing a modification of the invention, and Figs. 10 and 11 represent a further modification thereof. Fig. 12 is a fragmentary view in cross section of a control apparatus embodying the invention in still another modified form; Fig. 13 is an elevation view, partly broken away, of the arrangement of Fig. 12, and Fig. 14 is a detail view of a portion of the apparatus of Fig. 12. Fig. 15 is a schematic representation of a control circuit which may be utilized in connection with any of the modified forms of the invention.

Although the invention is subject to a variety of applications, it is especially useful in providing a sequence control for apparatus of the multi-revolution type utilized to position a rotary controlled element in a preselected angular position and will be described in that connection. By the expression "multi-revolution type" is meant apparatus including a rotary driving element effective to position a rotary controlled element in any selected one of a plurality of predetermined positions, any two of which may have an angular separation represented by rotation of the driving element exceeding one complete revolution.

Referring now more particularly to Figs. 1 to 4, inclusive, there is represented apparatus of the multi-revolution type for precisely positioning a rotary controlled element in a preselected one of a series of predetermined angular positions within its rotational range and including the present invention in one form. While the apparatus is to be described in connection with determining the tuning adjustments of a radio receiver, the receiving system, per se, forms no part of the invention and, therefore, only its tunable element 10 has been indicated in order to simplify the drawings. Element 10 will be considered as the usual adjustable condenser which determines the operating frequency of the receiver although, as is well understood, several such condensers or equivalent tuning devices may be ganged for simultaneous or unicontrol adjustment.

In order to realize a selective control of the rotary controlled tuning element 10 as between several available predetermined settings, the apparatus comprises a plurality of control units which are mutually oriented so that each corresponds with an assigned one of the desired tuning settings. The control units are designated 11a—11f, inclusive, in Fig. 1, but since all are of substantially the same construction, only the first two have been shown in section and the remainder are indicated schematically by dash-dot blocks. The method of illustration chosen simplifies reading of the drawing, shows the structural arrangement of two control units and common or interconnected portions thereof. Each of these control units is adjustably fixed to an enlarged section 12′ of a shaft 12 which is rotatable over a range of many revolutions. A gear train 13, 14 connects shaft 12 with tuning element 10, a suitable speed reduction being employed so that rotation of shaft 12 throughout its entire range effects only the desired total displacement of the condenser shaft, usually of the order of 180 degrees. By virtue of the connection of shaft 12 with the tuning element, each preselected angular position of the shaft determines and corresponds with a related tuning position of the condenser shaft and a selected operating frequency of the receiver including this condenser.

In describing the construction of the control units, reference will be made to the first such unit 11a, but it will be understood that the description applies equally well to each of the remaining ones. Control unit 11a comprises a fast rotatable member 20a adjustably secured, in a manner to be described hereinafter, to shaft section 12′ for concurrent rotation therewith. Member 20a is, therefore, rotatable within a multi-revolution range and is provided on its external periphery with stop provisions which may take the form of a recess 21a clearly shown in Figs. 2 and 5. The control unit also includes a stop device for controlling the position of the rotary controlled element by engaging with the recess 21a of fast member 20a. This stop device is movable from an inactive position into an active position wherein it is able to engage recess 21a of the fast member and is shown as a bell crank 22a pivotally supported upon a shaft or rod 23 which is common to all control units. One arm of bell crank 22a is provided with a projection 24a proportioned to be received by recess 21a. The projection 24a is maintained in its inactive position by means of a leaf spring 25a, anchored to the frame of the apparatus and engaging another projection 26a of bell crank 22a normally to rotate the bell crank in a clockwise direction.

The engagement of stop projection 24a with fast member 20a, when unit 11a is selected to determine the position of controlled element 10, is under the control of a slow rotatable member 27a supported in substantially concentric relation with fast member 20a and permitting engagement of stop element 24a with fast member 20a only when the slow member is rotated to a predetermined angular position. The slow member 27a has the form of a cam ring and its average diameter exceeds that of fast member 20a. It has a low cam portion 28a and a high cam portion 29a, where "low" and "high" indicate the order of cam radius. Each cam section subtends an arc of slightly less than 180 degrees and a stop recess 30a on the external periphery separates the cam sectors.

At least a portion of slow member 27a is displaceable to simulate rotation of that member in one direction, specifically a clockwise direction, over a small fraction of a revolution. For the case under consideration, only a portion of the rotatable member is displaceable and that portion comprises an interlock plate 31a of arcuate configuration shown in Figs. 3 and 4. The plate 31a is slidably supported on the slow rotatable member in the vicinity of its recess 30a and, when displaced, at least partially fills that recess. More specifically, shoulder studs 32a, 33a, which enter elongated slots of plate 31a, slidably support that plate on the high cam portion 29a so that displacement of the plate effectively constitutes an extension of the high cam sector.

The apparatus further includes a driving system for simultaneously driving the fast and slow members at a preselected speed ratio. The driving system comprises a hypocycloidal planetary gear system positioned between these rotatable members in coaxial alignment therewith and interconnecting them so that rotation of one effects simultaneous rotation of the other at the desired speed ratio. The hypocycloidal gear train is provided by a pinion or sun gear 34a received and rotatable within a well or recess in a hub member 35a mechanically secured to fast member 20a, as shown in Figs. 1 and 2. Sun gear 34a is freely rotatable on a stud shaft affixed to fast member 20a and is in constant meshing engagement with a rotatable gear 36a formed on the internal periphery of the ring-like slow member 27a and an internal gear 37a provided in a stationary member 38a. Member 38a, as represented in Fig. 2, has a bifurcated portion 39a which receives a rod 40 for holding that member and its internal gear 37a stationary. Rod 40 is common to all of the control units.

The diameter of hub member 35a is selected to be only slightly smaller than that of gears 36a, 37a so that the hub may serve as a bearing support for such gears while at the same time being rotatable relative thereto. An end plate 41a, having a diameter exceeding that of hub member 35a, serves as a stop collar to maintain gears 36a and 37a on the hub. Rivets 42a, 42a lock fast member 20a, hub 35a, and end plate 41a into one mechanical assembly. In order to introduce a desired speed differential, rotatable gear 36a has more teeth than stationary gear 37a. Where the effective rotational range of shaft 12 is to be thirty revolutions, gear 36a may have sixty-five teeth and gear 37a may have sixty-four teeth. The driving system is completed by means for rotating shaft 12 and with it fast member 20a. This means is provided by a reversible motor 43, connected through a conventional slip clutch 44 and a gear train 45–48, inclusive, to shaft 12.

While any of a number of known connecting arrangements may be employed to secure the fast member assembly 20a—35a—41a to shaft section 12', the one shown includes a hub 55a suitably attached to the shaft, as by a press fit. The hub has a shoulder 56a at one end upon which member 20a may be rotated. A washer 57a in conjunction with a clamping screw 58a locks the fast rotatable member 20a to its hub in a preselected angular position and constitutes means for providing a continuous driving connection from one of the rotatable members, specifically from the fast member, to the rotary controlled tuning element 10 through shaft 12.

An extension 60a of bell crank 22a serves as the armature of an associated selector magnet 61a which may be energized to select control unit 11a to establish its assigned setting of condenser 10 through shaft 12.

Figure 5:
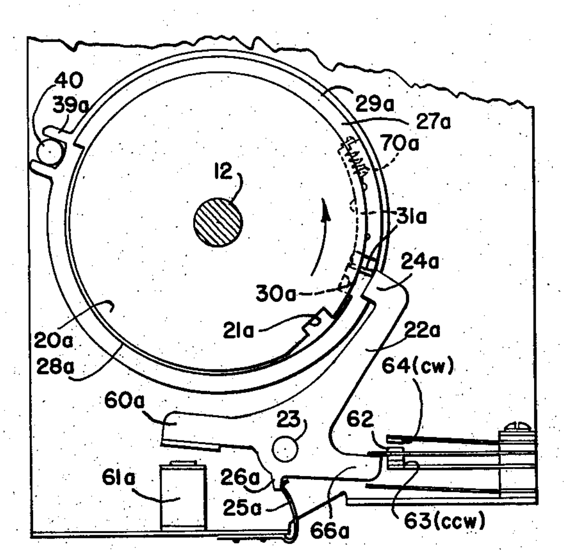
Figures 6, 7:
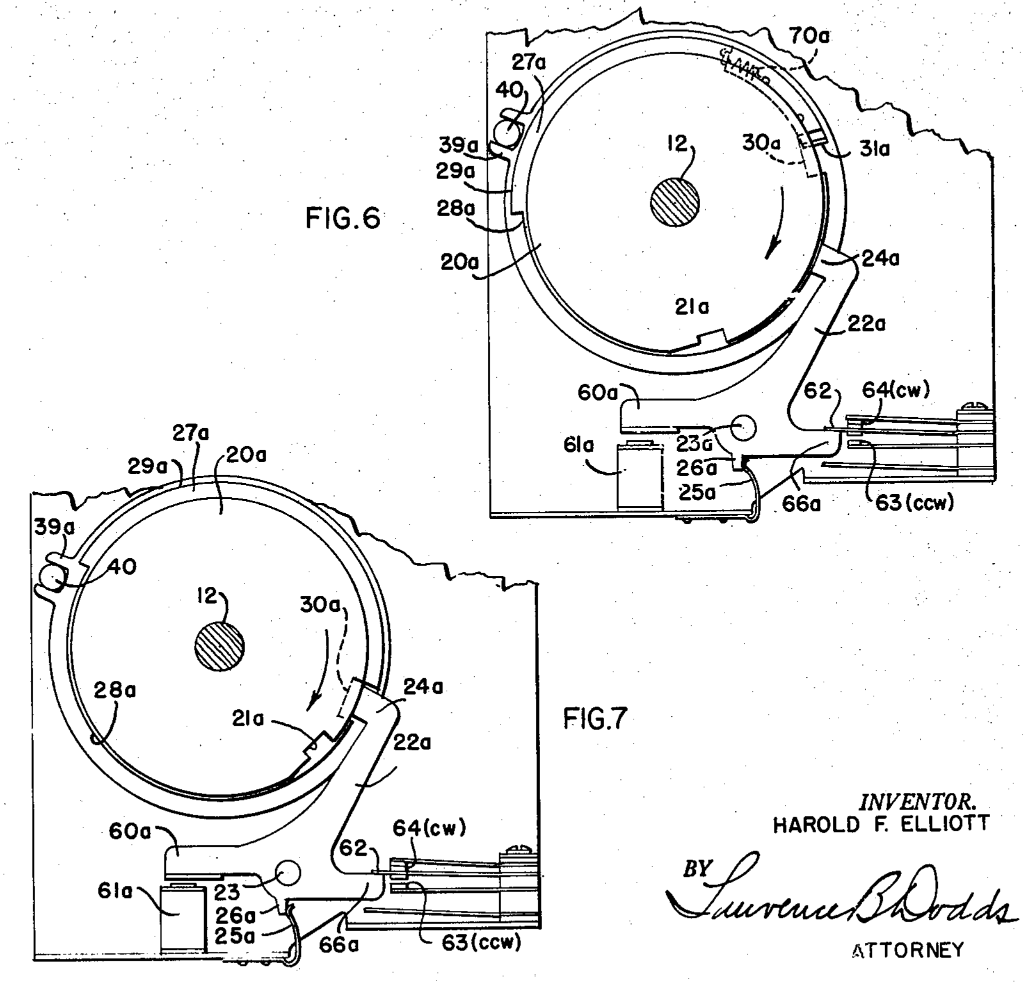

The invention contemplates direct homing of the fast and slow members to their predetermined positions, that is, a control of the direction of rotation which results in driving such members to their home positions through the shortest possible angular distance. This is accomplished by a sensing means, responsive to the orientation of slow member 27a relative to its predetermined or home position, for controlling the direction of rotation of the driving system. The sensing means comprises a switch of the two-position type having a movable intermediate resilient contact 62 which may engage either of opposed fixed contacts 63, 64. It will be assumed that the motor circuit completed through contact 63, as described hereinafter, establishes a counter-clockwise (CCW) direction of rotation for the planetary gear system and rotatable members 20a and 27a, while contact 64 establishes an opposite or clockwise (CW) direction of rotation. The engagement of movable contact 62 with its associated fixed contacts 63 and 64 is determined by a switch actuating device in the form of a bail 65 extending over a further extension 66a of bell crank 22a to be engaged thereby and actuated in accordance with the orientation of slow member 27a. The bail 65 similarly extends over the corresponding projections of the bell cranks in each of the remaining control units so that any one selected to control the apparatus may accomplish direct homing. Normally, contact 62 is closed upon contact 63 and is retained there for small throws of bell crank 22a and bail 65, as shown in Fig. 5. However, greater throws of the bell crank shift contact 62 into engagement with contact 64, as indicated in Fig. 6.

The apparatus further includes means for displacing the displaceable portion 31a of slow member 27a when the slow member is initially in its predetermined or home position to avoid a possible mode of operation to be discussed hereinafter. While this displacement may be accomplished, if desired, only when the slow member is initially in its home position, it is convenient to employ the spring 70a, shown in Fig. 3, for normally and yieldably displacing the plate 31a. The spring is anchored at one end to stud 33a and at the other end to a projection on plate 31a. It normally positions the plate partially to fill recess 30a of the slow member, as represented in Fig. 6.

A suitable circuit arrangement for energizing motor 43 and the selector magnets 61 is represented in Fig. 15, where the potential source is schematically indicated at 75. The customary push-button controls 76 are provided, one for each control unit. The push button 76a closes contacts 77a and 78a to complete the motor circuit and also closes a circuit at the contact 79a for energizing a selector magnet 61a. The switch 62—64 is shown connected with a split field winding 80 for motor 43, providing reversible control of the motor operation. The interconnection of bell crank 22a with the movable contact 62 is represented schematically at 81.

As previously pointed out, the several control units are identical in construction and the elements thus far recited having the designation character "a" are duplicated in each of the others. It will be noted in Fig. 1, however, that the clamping screw 58b of unit 11b passes through the hub 55a of the preceding unit. In similar manner, the clamping screw for any other unit further along the stack or series passes through the hubs of the preceding ones and is accessible for adjustment at the front of the stack.

In utilizing the described apparatus to position shaft 12 and with it the controlled tuning condenser 10 into any of the several possible preselected positions, it will be understood that the fast and slow rotatable members of each control unit are initially oriented relative to the shaft to correspond with an assigned one of the selectable positions. This orientation may be achieved by first pressing a selected push button, as 76*a*, and holding it until "home" position is reached. The corresponding clamping screw, as 58*a*, is then released, and shaft 12 is rotated by knob 82, until the desired setting of condenser 10 is reached. The clamping screw 58*a*, is then retightened and the operation is repeated for the other positions.

Having oriented each of the several control units in the manner described to correspond with the selectable positions of controlled condenser 10, the apparatus may thereafter be employed quickly and precisely to position the condenser into any selected one of its available settings. Alternatively, a knob 82 coupled to shaft 12 enables an operator to tune the receiving apparatus independently of the control units and to tuning conditions other than those assigned to the control units. The remainder of this description, however, will be devoted to tuning operations through the aid of the several control units.

With the apparatus at rest, springs 25 urge all stop projections 24 away from their associated slow members 27 and bias such stop projections to their inactive positions. Where the apparatus is to position the tuning condenser, the push button 76 for a particular control unit is depressed, completing the energizing circuit for motor 43 and the appropriate selector magnet.

Assuming push button 76*a* to be actuated, the motor circuit is completed and magnet 61*a* is energized. It attracts its armature 60*a* and rotates bell crank 22*a* in a counterclockwise direction about its pivot 23, causing stop projection 24*a* to be brought into engagement with slow member 27*a* as a cam follower. Depending upon the position of shaft 12 at the time the selector magnet is energized, stop projection 24*a* will usually engage either the high cam sector 29*a* of slow member 27*a*, in a manner similar to that represented in Fig. 5, or it will meet the low cam sector 28*a* as indicated in Fig. 6.

If the follower 24*a* engages high cam portion 29*a*, there is a limited or restricted resulting rotation of bell crank 22*a* so that middle contact switch 62 remains in engagement with contact 63, establishing a direction of rotation which is counter-clockwise, as viewed in Fig. 5. With motor 43 energized and the planetary reduction gear system interconnecting the fast and slow members, these members rotate concurrently at a preselected speed ratio, 65:1 for the described planetary system, until slow member 27*a* not only arrives at, but is driven beyond, its preselected or home position. The slow member is driven past its home position because spring 70*a* has displaced interlock plate 31*a* partially to fill the recess 30*a* of the slow member, providing an effective recess which is too small to receive projection 24*a*.

This direction of rotation continues until interlock plate 31*a* is also driven beyond stop projection 24*a*. At that time the bell crank 22*a* moves into engagement with the low cam portion 28*a*. This added displacement of the bell crank shifts contact 62 to contact 64, reversing the direction of rotation of the driving system. This condition prevails until stop projection 24*a* engages the leading edge of interlock plate 31*a* and, by overcoming its bias spring 70*a*, pushes the interlock plate in the direction of high-cam section 29*a* of the slow member. When the interlock plate has thus been removed from stop recess 30*a*, stop projection 24*a* is received by that recess. At that time stop projection 24*a* engages fast member 20*a* as a cam follower and, when recess 21*a* is also brought into registration with stop projection 24*a*, as shown in Fig. 2, the entire driving system is locked against further rotation. This locking is effected when rotatable members 20*a* and 27*a* have positioned the rotor of condenser 10 through shaft 12 to a preselected point in its rotational range and is permitted by virtue of slip clutch 44, which is arranged so that motor 43 spins to a stalled condition when the rotatable member becomes locked at home position.

When the initial orientation of shaft 12 and slow member 27*a* is such that low cam portion 28*a* is opposite stop projection 24*a*, as represented in Fig. 6, the first movement of bell crank 22*a* is sufficient to break the motor circuit at contacts 62, 63 and complete it through contacts 63, 64, initiating a clockwise sense of rotation. The driving system then actuates the control unit until stop projection 24*a* displaces interlock plate 31*a* from recess 30*a* of the slow member, permitting the stop projection to register with the stop recesses in both the slow and fast members to arrest the shaft and the controlled tuning condenser in its selected position.

The movement of any bell crank 22 upon the energization of its associated selector magnet performs, in conjunction with cam portions 28, 29 of the slow member and switch 62—64, a sensing function to determine the appropriate direction of rotation for direct homing. The expression "direct homing" is used herein and in the appended claims to indicate a direction of rotation which drives the controlled element to its preselected position through the shortest possible angular distance.

While the operation as described may be relied upon for many operating conditions, the interlock plate 31*a* provides an interlock or sequence control which avoids one possible mode of operation that may, under certain circumstances, result in jamming and inaccurate tuning. When tuning between two stations that are very close to one another in the freqencuy spectrum it is possible to have an initial condition such as represented in Fig. 7 because each fast member is driven any time shaft 12 rotates, and each slow member necessarily follows the rotation of its fast member. Here the expression "initial condition" indicates the setting of the controlled element immediately prior to the actuation of any selector magnet to achieve motor-driven adjustment of tuning condenser 10 to a selected predetermined position. In Fig. 7 the apparatus is shown without interlock plate 31*a*, and slow member 27*a* is at its home position while recess 21*a* of the fast member is on the clockwise side of stop projection 24*a*. In the absence of the interlock plate, stop projection 24*a* is free to register with recess 30*a* of the slow member upon the energization of selector magnet 61*a*. Were that to be permitted, projection 66*a* of bell crank 22*a* would close contacts 62 and 64 and establish a clockwise direction of rotation, carrying recess 21a away from stop projection 24a and bringing the trailing edge of recess 30a against the stop projection, resulting in jamming and erroneous tuning.

Jamming is avoided by interlock plate 31a and its spring 70a which displaces the interlock plate partially to fill recess 30a, as clearly shown in Fig. 6. As a consequence, when the initial conditions of Fig. 7 would otherwise exist, the interlock plate effectively extends high-cam sector 29a of the slow member. This is equivalent to or simulates rotation of slow member 27a a small fraction of a revolution in a clockwise direction so that when magnet 61a is energized the conditions represented in Fig. 5 arise. As a result, the apparatus follows the first-described sequence of operations in which the rotatable members are driven in a counter-clockwise direction to move recess 21a to the counter-clockwise side of projection 24a before the direction of rotation is reversed. In this manner the control unit properly positions the controlled tuning condenser 10 and precludes any possibility of jamming. Thus, it is apparent that the interlock plate causes the fast and slow members to arrive at their home positions from the same direction irrespective of the initial conditions. This takes up all slack and lost motion in a given direction for all tuning operations and assures high precision in addition to preventing an erroneous operating sequence which otherwise causes jamming.

While it is preferable to displace only a portion of the slow rotatable member to effect a sequence control, as explained in connection with the embodiment of Figs. 1–4, inclusive, the same function may be accomplished by displacing the entire slow member. Arrangements of the latter type are disclosed in the remaining figures of the drawings. In each case, the individual control unit is generally similar to that already described and corresponding components thereof are identified by similar reference characters. Additionally, only one unit has been represented for each modified form of the invention in order to reduce the number of illustrations, but it will be understood that the number of control units employed, whatever form of the invention they embody, is determined by the number of preset positions desired for the rotary controlled element, tuning condenser 10.

In the arrangement represented in Figs. 8 and 9, slow rotatable member 27 is displaceable over a small fraction of a revolution in a clockwise direction independently of the driving system including motor 43. To that end, the bifurcation 139 of stationary member 138 is selected to be larger than the diameter of rod 40 and an additional spring 85, anchored at one end to the apparatus frame and bearing against bifurcation 139 at the other, normally displaces stationary member 138 a small portion of a revolution in a clockwise direction, as viewed in Fig. 9. Since the internal gear 37 of stationary member 138 is continuously connected to internal gear 36 of slow member 27 through pinion gear 34, the rotatable member is displaceable with stationary member 138 while, at the same time, being rotatable relative thereto.

In the operation of this embodiment of the invention, spring 85 displaces the normally stationary member 138 and, with it, rotatable member 27 prior to the energization of motor 43. When motor 43 and magnet 61 are energized, bringing stop projection 24 against slow member 27 as a cam follower, an initial direction of rotation is established to effect direct homing of slow member 27 and fast member 20, as previously explained. As the rotatable members are driven, stop projection 24 registers with stop recesses 30 and 21, in turn, always engaging the latter when the driving system is rotating in a clockwise direction, as represented in Fig. 8. As the home positions are approached, projection 24 abuts against one edge of recess 30 in the slow member and displaces both this slow member and stationary member 138 in a counter-clockwise direction by overcoming the force of spring 85. The final home position is shown in Fig. 8.

If, neglecting the effect of spring 85, momentarily, the initial position of the slow member is as depicted in Fig. 7 with recess 30a adjacent stop projection 24, the displacement of stationary member 138 and slow member 27 under the influence of spring 85 creates a condition similar to that represented in Fig. 9. Energization of magnet 61 then brings projection 24 into engagement with high-cam sector 29 so that the initial direction of rotation is counter-clockwise, permitting recess 21 of fast member 20 to be positioned to the counter-clockwise side of projection 24 before the direction of rotation is reversed. In this way, spring 85 by displacing members 27 and 138 accomplishes a desired sequence control. Rod 40 limits the displacement of member 138 in both directions so that accuracy in setting the rotary controlled element connected to shaft 12 is inherent.

The modification of Figs. 10 and 11 is similar in many respects to that of Figs. 8 and 9 but relies on spring loading in the planetary gear system to displace slow member 27 for sequence control. A supplementary pinion 86 is provided, being carried by and freely rotatable upon a stud shaft 87 secured to one end of a lever 88 pivotal about a pivot rod 89. To obtain a compact structure, it is convenient to have pivot rod 89 extend between fast member 120 and the locking disc 41, shown in Fig. 1, to rotate therewith. A cutout or window 90 is provided in fast member 120 and lever 88 is shaped to rest in the plane of the window. A spring 91 holds pinion 86 in engagement with internal gear 36 of slow member 27 and internal gear 37 of stationary member 38. The action of spring 91 takes up the slack between the gear teeth and constitutes means for displacing rotatable member 27 over a small fraction of a revolution. With the arrangement represented, slow member 27 is displaced in a clockwise direction.

For an initial condition which, without the benefit of the sequence control feature, is as indicated in Fig. 7, spring 91 displaces slow member 27 to establish the relative orientation of this member and stop projection 24 shown in Fig. 11. The sequence control is thus seen to be very similar to that achieved with the arrangements of Figs. 8 and 9. As rotatable members 120 and 27 arrive at home position and projection 24 registers with recesses 21 and 30, in the manner represented in Fig. 10, spring 91 permits pivot lever 88 and pinion 86 to be lifted so that slow member 27 may shift slightly in a counter-clockwise direction. This causes recesses 21 and 30 to become more fully aligned and enables projection 24 fully to register therewith.

Another spring loading arrangement is represented in Figs. 12–14, inclusive, wherein the planetary gear system comprises a spur gear 136 connected to slow member 127 and a spur gear 137 connected to stationary member 238. The spur gears have unequal numbers of teeth, as explained in discussing the first embodiment of the invention, and are engaged, respectively, by similar pinion gears 134 and 234. The pinion gears are supported by a shaft 93 which, itself, is supported by and rotatable within fast member 120. Gear 134 is rigidly affixed to one end of shaft 93 which has a flattened portion at its opposite end received within an aperture 94 in the hub section of gear 234, as illustrated in Fig. 14. Aperture 94 has straight sections which are spaced slightly greater than the distance between the flattened sides of shaft 93 so that there is limited play of the shaft within the aperture. A coiled spring 95, anchored between shaft 93 and gear 234, completes the interconnection of pinions 134 and 234 and provides means for effecting relative rotation therebetween to displace slow member 27 for sequence control.

The spring 95 causes shaft 93 to be displaced within the limits established by the relative dimensions of the flattened portion of the shaft and the aperture 94 in gear 234. Accordingly, gear 134 is displaced and shifts slow member 27 a small fraction of a revolution in a clockwise direction. Hence, when the conditions of Fig. 7 would otherwise be encountered in tuning between two stations having closely spaced frequencies, this displacement of slow member 27, which is in a clockwise direction, gives rise to the relative arrangement of parts represented in Fig. 14. Therefore, the initial direction of rotation is counter-clockwise, assuring that recess 21 of fast member 120 is to the counter-clockwise side of projection 24 before the direction of rotation is reversed. As the home positions are approached, the lost motion introduced by the play of shaft 93 within aperture 94 permits slow member 27 to be displaced in a counter-clockwise direction, against the action of spring 95, so that recesses 21 and 30 become fully aligned with one another and completely registered with projection 24, as shown in Fig. 13. This modification is seen, then, to be similar to that of Figs. 10 and 11.

In each described embodiment, the invention is used to establish a desired sequence control in apparatus of the multi-revolution type, although the invention, especially in the form of Figs. 1–4, inclusive, may also be employed in apparatus wherein the rotational range of the controlling elements is less than one complete revolution. All forms provide a mechanically simple sequence control for assuring proper operation and for avoiding any tendency toward jamming or erroneous tuning.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. Apparatus for positioning a rotary controlled element in a preselected angular position comprising: a stop device for controlling the position of said element; a rotatable member having provisions for registering with said stop device only when said member is in a predetermined angular position; means comprising at least a portion of said member and displaceable to simulate rotation of said member in one direction over a small fraction of a revolution; a reversible driving system for said element and said member; sensing means, responsive to the orientation of said member relative to said predetermined position, for controlling the direction of rotation of said system to effect direct homing of said member to said predetermined position; and means for displacing said displaceable means when said member is initially in said predetermined position to cause said sensing means to establish an opposite direction of rotation.

2. Apparatus for positioning a rotary controlled element in a preselected angular position comprising: a stop device for controlling the position of said element; a rotatable member having provisions for registering with said stop device only when said member is in a predetermined angular position; means comprising at least a portion of said member and displaceable to simulate rotation of said member in one direction over a small fraction of a revolution; a reversible driving system for said element and said member; sensing means, responsive to the orientation of said member relative to said predetermined position, for controlling the direction of rotation of said system to effect direct homing of said member to said predetermined position; and yieldable means for normally displacing said displaceable means to cause said sensing means to establish an opposite direction of rotation when said member is initially in said predetermined position.

3. Apparatus for positioning a rotary controlled element in a preselected angular position comprising: a stop device for controlling the position of said element; a rotatable member having provisions for registering with said stop device only when said member is in a predetermined angular position; means comprising at least a portion of said member and displaceable to simulate rotation of said member in one direction over a small fraction of a revolution; a reversible driving system for said element and said member; sensing means, responsive to the orientation of said member relative to said predetermined position, for controlling the direction of rotation of said system to effect direct homing of said member to said predetermined position; and a spring normally displacing said displaceable means to cause said sensing means to establish an opposite direction of rotation when said member is initially in said predetermined position.

4. Apparatus for positioning a rotary controlled element in a preselected angular position comprising: a stop device for controlling the position of said element; a rotatable member having provisions for registering with said stop device only when said member is in a predetermined angular position and having an arcuate portion displaceable along the periphery of said member to simulate rotation of said member in one direction over a small fraction of a revolution; a reversible driving system for said element and said member; sensing means, responsive to the orientation of said member relative to said predetermined position, for controlling the direction of rotation of said system to effect direct homing of said member to said predetermined position; and means for displacing said portion of said member when said member is initially in said predetermined position to cause said sensing means to establish an opposite direction of rotation.

5. Apparatus for positioning a rotary controlled element in a preselected angular position comprising: a stop device for controlling the position of said element; a rotatable member having a peripheral stop recess for registering with said stop device when said member is in a predetermined angular position and having a portion which is displaceable at least partially to fill said recess and permit registration of said stop device and recess only when said member is rotated to said predetermined position from a particular direction; a reversible driving system for said element and said member; sensing means, responsive to the orientation of said member relative to said predetermined position, for controlling the direction of rotation of said system to effect direct homing of said member to said predetermined position; and means for displacing said portion of said member when said member is initially in said predetermined position to cause said sensing means to establish a direction of rotation opposite to said particular direction.

6. Apparatus for positioning a rotary controlled element in a preselected angular position comprising: a stop device for controlling the position of said element; a rotatable member having a peripheral stop recess for registering with said stop device when said member is in a predetermined angular position; an interlock plate of arcuate configuration slidably supported on said member in the vicinity of said recess and displaceable along the periphery of said member at least partially to fill said recess and permit registration of said stop device and recess only when said member is rotated to said predetermined position from a particular direction; a reversible driving system for said element and said member; sensing means, responsive to the orientation of said member relative to said predetermined position, for controlling the direction of rotation of said system to effect direct homing of said member to said predetermined position; and yieldable means for displacing said interlock plate when said member is initially in said predetermined position to cause said sensing means to establish a direction of rotation opposite to said particular direction.

7. Apparatus for positioning a rotary controlled element in a preselected angular position comprising: a stop device for controlling the position of said element; a rotatable cam member having high and low cam sectors individually less than 180 degrees separated by a peripheral stop recess for receiving said stop device when said member is in a predetermined angular position; an interlock plate of arcuate configuration slidably supported on said member in the vicinity of said recess and displaceable along the periphery of said member at least partially to fill said recess and permit registration of said stop device and recess only when said member is rotated to said predetermined position from a particular direction; a reversible driving system for said element and said member; sensing means, responsive to the orientation of said member relative to said predetermined position, for controlling the direction of rotation of said system to effect direct homing of said member to said predetermined position; and yieldable means for displacing said interlock plate when said member is initially in said predetermined position to cause said sensing means to establish a direction of rotation opposite to said particular direction.

8. Apparatus for positioning a rotary controlled element in a preselected angular position comprising: a stop device for controlling the position of said element; a rotatable cam member having high and low cam sectors individually less than 180 degrees separated by a peripheral stop recess for registering with said stop device when said member is in a predetermined angular position; an interlock plate of arcuate configuration slidably supported on said high cam sector in the vicinity of said recess and displaceable along the periphery of said member as an extension of said high cam sector at least partially to fill said recess and permit registration of said stop device and recess only when said member is rotated to said predetermined position from a particular direction; a reversible driving system for said element and said member; sensing means, responsive to the orientation of said member relative to said predetermined position, for controlling the direction of rotation of said system to effect direct homing of said member to said predetermined position; and yieldable means for displacing said interlock plate when said member is initially in said predetermined position to cause said sensing means to establish a direction of rotation opposite to said particular direction.

9. Apparatus for positioning a rotary controlled element in a preselected angular position comprising: a stop device for controlling the position of said element; a rotatable member having provisions for registering with said stop device only when said member is in a predetermined angular position and displaceable in one direction over a small fraction of a revolution; a reversible driving system for said element and said member; sensing means, responsive to the orientation of said member relative to said predetermined position, for controlling the direction of rotation of said system to effect direct homing of said member to said predetermined position; and means for displacing said member when said member is initially in said predetermined position to cause said sensing means to establish an opposite direction of rotation.

10. Apparatus for positioning a rotary controlled element in a preselected angular position comprising: a stop device for controlling the position of said element; a rotatable member having provisions for registering with said stop device only when said member is in a predetermined angular position; means comprising at least a portion of said member and displaceable to simulate rotation of said member in one direction over a small fraction of a revolution; a reversible driving system for said element and said member; means for energizing said driving system; sensing means, responsive to the orientation of said member relative to said predetermined position, for controlling the direction of rotation of said system to effect direct homing of said member to said predetermined position; and means for displacing said displaceable means prior to the energization of said driving system when said member is initially in said predetermined position to cause said sensing means to establish an opposite direction of rotation.

11. Apparatus for positioning a rotary controlled element in a preselected angular position comprising: a normally stationary member displaceable in one direction over a small fraction of a revolution; a stop device for controlling the position of said element; a rotatable member connected with said stationary member for displacement therewith and also rotatable relative to said stationary member, said rotatable member having provisions for registering with said stop device only when said rotatable member is in a predetermined angular position; a reversible driving system for said element and said rotatable member; sensing means, responsive to the orientation of said rotatable member relative to said predetermined position, for controlling the direction of rotation of said system to effect direct homing of said rotatable member to said predetermined position; and means for displacing said stationary member when said rotatable member is initially in said predetermined position to cause said sensing means to establish an opposite direction of rotation.

12. Apparatus for positioning a rotary controlled element in a preselected angular position comprising: a normally stationary member displaceable in one direction over a small fraction of a revolution; a stop device for controlling the position of said element; a rotatable member connected with said stationary member for displacement therewith and also rotatable relative to said stationary member, said rotatable member having provisions for registering with said stop device only when said rotatable member is in a predetermined angular position; a reversible driving system for said element and said rotatable member; sensing means, responsive to the orientation of said rotatable member relative to said predetermined position, for controlling the direction of rotation of said system to effect direct homing of said rotatable member to said predetermined position; and yieldable means for normally displacing said stationary member to cause said sensing means to establish an opposite direction of rotation when said rotatable member is initially in said predetermined position.

13. Apparatus for positioning a rotary controlled element in a preselected angular position comprising: a normally stationary member displaceable in one direction over a small fraction of a revolution; a stop device for controlling the position of said element; a rotatable member having provisions for registering with said stop device only when said rotatable member is in a predetermined angular position; means for connecting said rotatable member to said stationary member for displacement therewith and for permitting rotation of said rotatable member relative to said stationary member; a reversible driving system for said element and said rotatable member; sensing means, responsive to the orientation of said rotatable member relative to said predetermined position, for controlling the direction of rotation of said system to effect direct homing of said rotatable member to said predetermined position; and means for displacing said stationary member when said rotatable member is initially in said predetermined position to cause said sensing means to establish an opposite direction of rotation.

14. Apparatus for positioning a rotary controlled element in a preselected angular position comprising: a stop device for controlling the position of said element; a rotatable member having provisions for registering with said stop device only when said member is in a predetermined angular position; a planetary gear train including a rotatable gear of a given number of teeth connected to said member, a stationary gear of a different number of teeth, and at least one pinion gear meshing with said rotatable and stationary gears; a reversible driving system for driving said element and said member through said gear train; sensing means, responsive to the orientation of said member relative to said predetermined position, for controlling the direction of rotation of said system to effect direct homing of said member to said predetermined position; and yieldable means for normally displacing said rotatable gear in one direction over a small fraction of a revolution to cause said sensing means to establish an opposite direction of rotation when said member is initially in said predetermined position.

15. Apparatus for positioning a rotary controlled element in a preselected angular position comprising: a stop device for controlling the position of said element; a rotatable member having provisions for registering with said stop device only when said member is in a predetermined angular position; a planetary gear train including a rotatable gear of a given number of teeth connected to said member, a stationary gear of a different number of teeth, and concurrently driven pinion gears meshing with said rotatable and stationary gears; a reversible driving system for driving said element and said member through said gear train; sensing means, responsive to the orientation of said member relative to said predetermined position, for controlling the direction of rotation of said system to effect direct homing of said member to said predetermined position; and spring loading means connected with at least one of said pinion gears for normally displacing said rotatable gear in one direction over a small fraction of a revolution to cause said sensing means to establish an opposite direction of rotation when said member is initially in said predetermined position.

16. Apparatus for positioning a rotary controlled element in a preselected angular position comprising: a stop device for controlling the position of said element; a rotatable member having provisions for registering with said stop device only when said member is in a predetermined angular position; a planetary gear train including a rotatable gear of a given number of teeth connected to said member, a stationary gear of a different number of teeth, and concurrently driven pinion gears meshing with said rotatable and stationary gears and rotatable relative to one another over a small fraction of a revolution; a reversible driving system for driving said element and said member through said gear train; sensing means, responsive to the orientation of said member relative to said predetermined position, for controlling the direction of rotation of said system to effect direct homing of said member to said predetermined position; and a spring interconnecting said pinion gears for normally effecting relative rotation therebetween to displace said rotatable gear in one direction over a small fraction of a revolution to cause said sensing means to establish an opposite direction of rotation when said member is initially in said predetermined position.

17. Apparatus for positioning a rotary controlled element in a preselected angular position comprising: a fast rotatable member rotatable within a multi-revolution range and including stop provisions; a stop device movable from an inactive position into registration with said stop provisions to arrest said fast member in a preselected angular position related to said predetermined position; a slow rotatable member controlling said stop device to permit registration with said stop provisions only when said slow member is in a predetermined angular position; means comprising at least a portion of said slow rotatable member and displaceable to simulate rotation of said slow member in one direction over a small fraction of a revolution; means for providing a driving connection from one of said members to said rotary controlled element; a reversible driving system for simultaneously driving said members at a preselected speed ratio; sensing means, responsive to the orientation of said slow member relative to said predetermined position thereof, for controlling the direction of rotation of said system to effect direct homing of said slow member to said predetermined position; and means for displacing said displaceable means when said slow member is initially in said predetermined position to cause said sensing means to establish an opposite direction of rotation.

18. Apparatus for positioning a rotary controlled element in a preselected angular position comprising: a fast rotatable member rotatable within a multi-revolution range and including stop provisions; a stop device movable from an inactive position into registration with said stop provisions to arrest said fast member in a preselected angular position related to said predetermined position; a slow rotatable member controlling said stop device to permit registration with said stop provisions only when said slow member is in a predetermined angular position and having at least a portion which is displaceable to simulate rotation of said slow member in one direction over a small fraction of a revolution; means for providing a driving connection from one of said members to said rotary controlled element; a reversible driving system for simultaneously driving said members at a preselected speed ratio; sensing means, responsive to the orientation of said slow member relative to said predetermined position thereof, for controlling the direction of rotation of said system to effect direct homing of said slow member to said predetermined position and for establishing rotation in said one direction upon the homing of said slow member; and means for displacing said portion of said slow member when said slow member is initially in said predetermined position to cause said sensing means to establish an opposite direction of rotation.

HAROLD F. ELLIOTT.

REFERENCES CITED

The following references are of record in the file of this patent:

UNITED STATES PATENTS

| Number | Name | Date |
|---|---|---|
| 2,391,470 | May | Dec. 25, 1945 |